April 14, 1953     M. KAPLOWITZ     2,634,651
ENLARGING APPARATUS
Filed Aug. 20, 1949     3 Sheets-Sheet 1
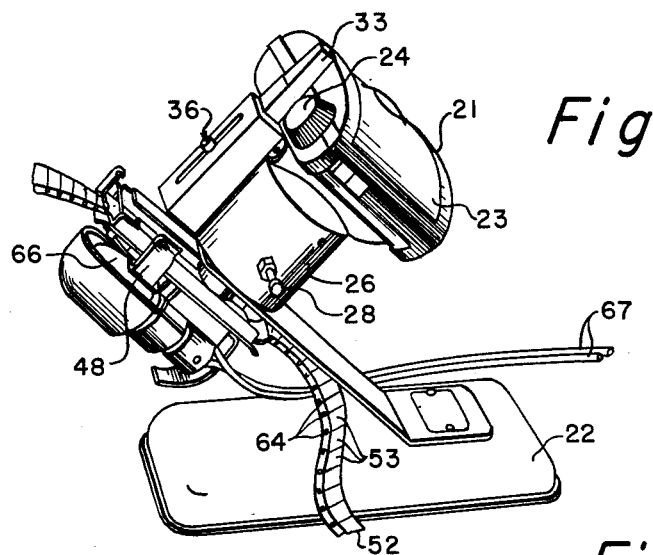
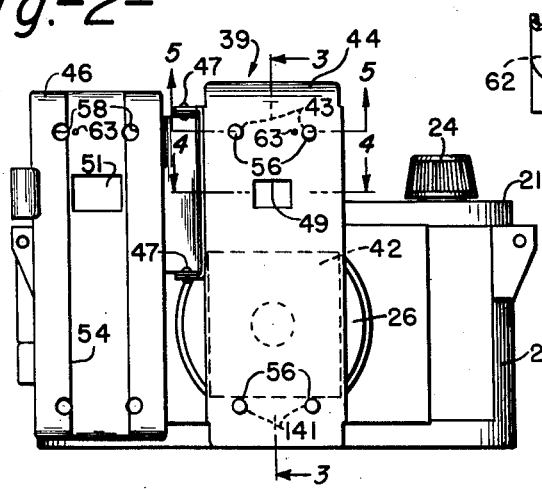
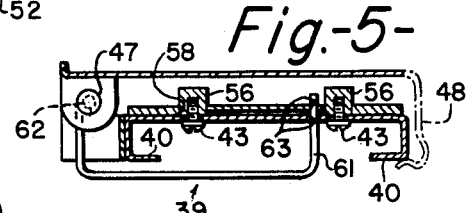
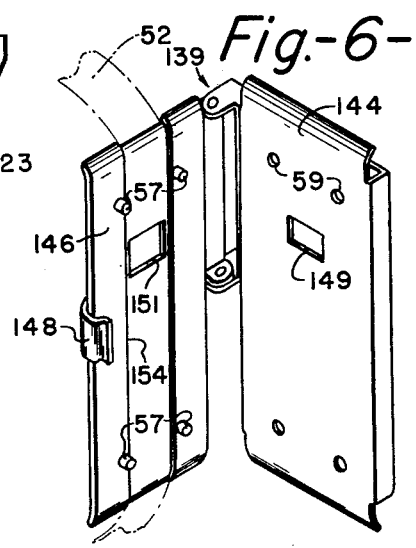
INVENTOR,
M. KAPLOWITZ,
BY:
his agent.

April 14, 1953 M. KAPLOWITZ 2,634,651
ENLARGING APPARATUS
Filed Aug. 20, 1949 3 Sheets-Sheet 2
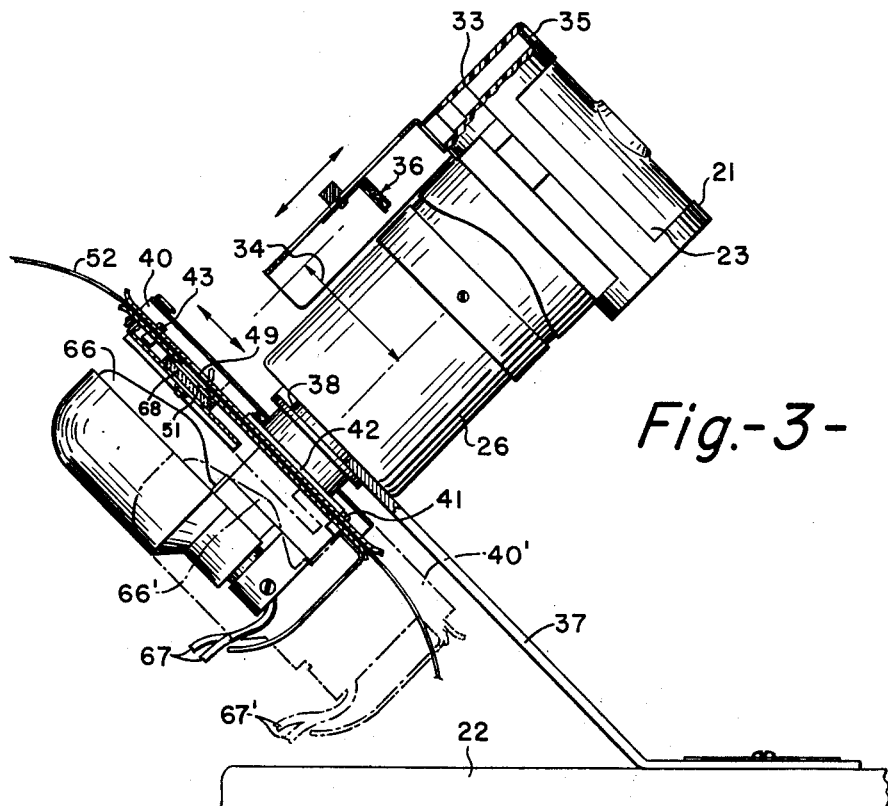
Fig.-3-
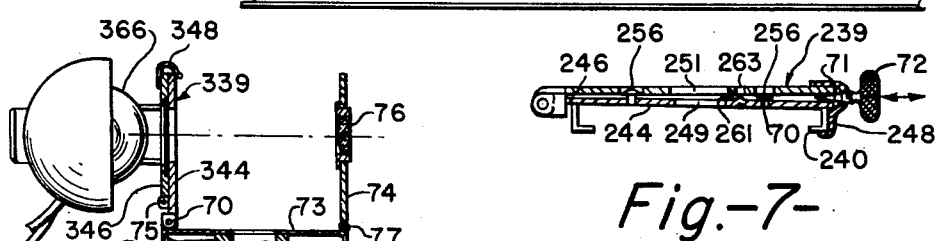
Fig.-7-
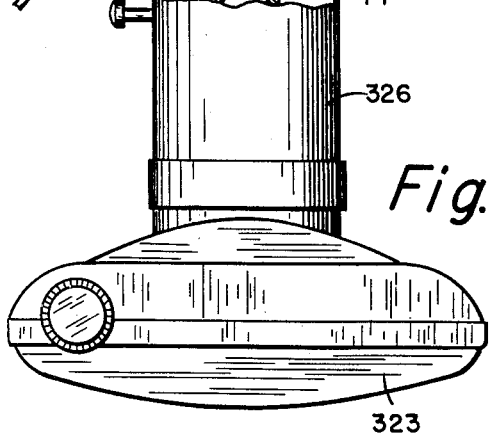
Fig.-8-
INVENTOR,
M. KAPLOWITZ,
BY:
his agent.

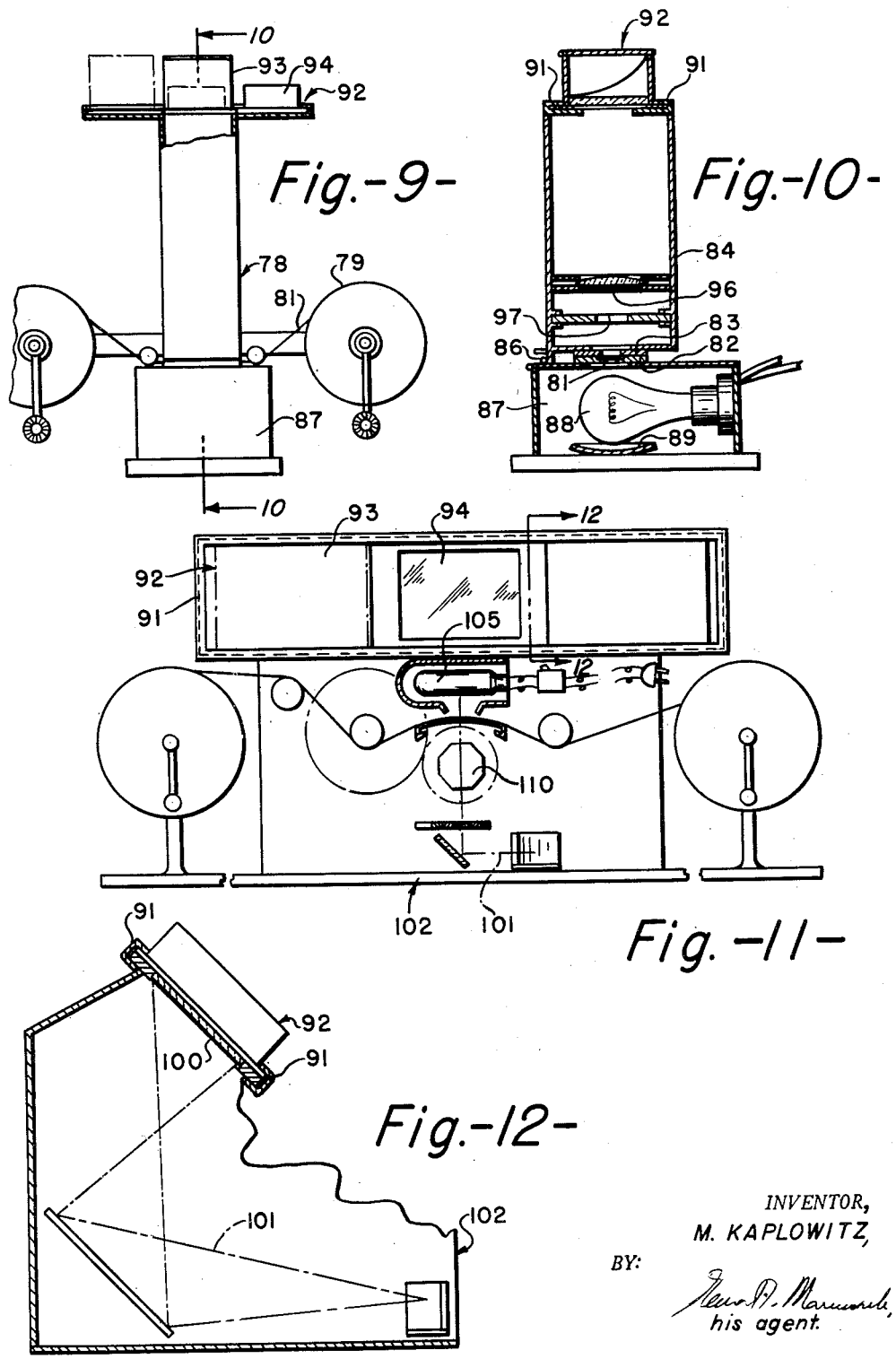

Patented Apr. 14, 1953

2,634,651

UNITED STATES PATENT OFFICE 2,634,651

ENLARGING APPARATUS

Morris Kaplowitz, New York, N. Y., assignor to Federal Manufacturing & Engineering Corp., a corporation of New York Application August 20, 1949, Serial No. 111,453

1 Claim. (Cl. 88—24)

The invention relates to photography and relates more particularly to photographic enlarging apparatus of the type wherein single frames of a film strip may be photographed on an enlarged scale.

Desirable features for enlarging apparatus of this type include lightness in weight, accuracy of reproduction, and simplicity of operation, and these features generally are found in apparatus now in use. However, the apparatus used heretofore have been deficient in that they usually require an outside light source and furthermore make preselection of the frame to be enlarged difficult. Still furthermore, they do not provide for accurately automatically positioning the selected frame for subsequent photographing.

The invention has therefore among its objects, in the endeavor to overcome the deficiencies of the prior art, to provide for placement of the film strip in the apparatus prior to viewing and photographing, to select a frame by viewing, and to position the selected frame accurately and automatically for subsequent exposure. Furthermore, it provides for obviating the use of an outside light source.

Further objects and advantages of the invention will be set forth in part in the following specification and in part will be obvious therefrom without being specifically referred to, the same being realized and attained as pointed out in the claim hereof.

With the above and other objects of the invention in view, the invention consists in the novel methods, construction, arrangement and combination of various devices, elements and parts, as set forth in the claim hereof, certain embodiments of the same being illustrated in the accompanying drawings and described in the specification.

In the accompanying drawings,

Fig. 1 is a perspective view of an enlarging apparatus in accordance with the invention;

Fig. 2 is a front elevational view thereof, the support having been omitted and the film strip clamping device having been opened for clarity of presentation;

Fig. 3 is a sectional view, partly in elevation, taken along line 3—3 of Fig. 2, but the clamping device being shown closed;

Fig. 4 is a fragmentary sectional view taken along line 4—4 of Fig. 2, the clamping device being shown closed;

Fig. 5 is a sectional view on an enlarged scale of the closed clamping device, taken along line 5—5 of Fig. 2;

Fig. 6 is a perspective view showing a modified clamping device partially open;

Fig. 7 is a sectional view similar to Fig. 5, but disclosing a further modified clamping device;

Fig. 8 is an elevational view, partly in section, of a modified enlarging apparatus;

Fig. 9 is an elevational view, partly in section, embodying a further modification of an enlarging device;

Fig. 10 is a sectional view taken along line 10—10 of Fig. 9;

Fig. 11 is an elevational view, partly in section and with certain parts broken away, embodying a still further modified enlarging apparatus of a film editing device type; and Fig. 12 is a fragmentary sectional view taken along line 12—12 of Fig. 11.

In carrying the invention into effect in the embodiments which have been selected for illustration in the accompanying drawings and for description in this specification, and referring now particularly to Figs. 1–5, there is provided an enlarging apparatus generally indicated at 21 that is held at a fixed angle on a support 22.

The enlarging apparatus 21 comprises a receptacle, for instance a camera 23, for photosensitized material, such as a film, with winding means 24 for said film, having a tubular support 26 including a shutter 27 and a shutter actuating knob 28, for a carrier 29 of a lens 31 and a diaphragm 32.

On the top of the camera 23 there is mounted a magnifying view finder or viewing device, generally indicated at 33, that includes a lens 35 and which has its optical axis parallel to that of the camera 23 and is spaced therefrom for a predetermined fixed distance 34, the importance and purpose of which will be explained later on.

In optical axial alignment with the lens 35 there is mounted on the tube 26 a hollow carrier 34 for an axially movable second lens 36 that cooperates with the first lens 35, and the view finder 33 is thereby made adjustable to accommodate the eye sights of all observers.

The enlarging device 21, as best shown in Fig. 3, may be mounted on a tilted bifurcated extension 37 of the support 22. The bifurcation engages an annular recess 38 of the lens carrier 29.

A holding device for a film strip to be enlarged, generally indicated at 39 is slidably mounted on the lens carrier 29. The holding device 39 is shiftable relative to the carrier 29 between two extreme positions, an upper position, shown in solid lines in Figs. 2 and 3, where studs 41 of the device 39 abut against the lower edge of a flange 42 of the stationary carrier 29, and a lower position (illustrated in broken lines in Fig. 3) wherein the studs 43 of the device 39 abut against the upper side of the flange 42. The studs 41 and 43 are spaced from each other for a distance designed to permit movement of the device 39 for an extent accurately corresponding to the said aforementioned distance 34.

The device 39 comprises two guides, such as plates 44 and 46, the plate 44 being provided with overturned edges 40 for the purpose of being slidably secured to the carrier 29, and the plate 46 being hinged to the plate 44 at two pivot points 47 and carries a resilient clamp 48 to engage one of the edges 40 for locking the two plates 44 and 46 in adjacent face-to-face position, as best shown in Fig. 4.

Each of the plates has an aperture, and these apertures are aligned when the device is closed with the plates in adjacent position. The plate 44 has the aperture 49 and the plate 46 has the aperture 51, and in the upper extreme position (shown in Fig. 2 and in solid lines in Fig. 3) the aligned apertures 49 and 51 are in registry with the optical axis of the view finder 33. In the lower extreme position (shown in broken lines in Fig. 3), on the other hand, the aligned apertures 49 and 51 are in registry with the optical axis of the enlarging camera 23.

The device 39 is adapted to hold between the plates 44 and 46 a film strip 52, one of the frames 53 of which is to be enlarged in the enlarging apparatus. The plate 46 may be provided with a groove 54 having a depth corresponding to a conventional film thickness of the type film (such as 8 mm. or 16 mm., etc.) for use of which the apparatus is intended and serves to permit abutment between the faces of the plates 44 and 46 when the device 39 is closed. The groove 54, of course, may also, instead, be provided in the plate 44 or, may be divided among both plates.

Projecting pins for engaging the marginal edges of the film strip may be provided either on the plate 44 where they are designated 56 and, for instance, are secured in alignment with the studs 41 and 43 for simplicity of construction (as shown in Figs. 2 and 5); or, they may instead be provided on the hinged plate 146 and designated 57, as shown in Fig. 6.

Apertures are provided on the other plate, for instance apertures 58 in the plate 46 of Fig. 2, or apertures 59 on the plate 144, as shown in the modification of Fig. 6.

The aperture 49, which is smaller than the aperture 51, is of rectangular shape and corresponds in size substantially to that of a frame 53 of a film strip 52 to be used. In order to secure a frame 53 in registry with the aligned apertures 49 and 51, there is a mechanism provided that removably positions the film strip 52 accurately for this purpose. A movable pin 61 that is pivoted at the pivot 47 and is tensioned by its resilient spiralic end 62 around the pivot 47, is arranged to protrude through aligned holes 63 in the two plates 44 and 46. The position of the holes 63 and of the pin 61 is so designed that the pin in that position will engage one of the sprocket holes 64 of the film strip 52 when a frame 53 is in registry with the aligned apertures 49 and 51. Thereby, a selected frame may be placed in registry with the aligned apertures and be secured in this position by inserting the pin 61 through the holes 63 and the sprocket hole of the film in registry therewith.

A light source, for instance an electric lamp 66 is secured to the swingable plate 46 and is swingable together therewith and may be interconnected by means of electric wires 67 to an electric source and a switch (not shown). The lamp 66 is so mounted on the plate 46 that the light beam emanating from the lamp 66 will be in registry at all times with the aperture 51, and therefore be in registry with both aligned apertures 49 and 51 when the device 39 is closed. A light diffusing disk 68 is provided on the exterior of the plate 46 between the aperture 51 and the lamp 66, as best shown in Figs. 3 and 4.

The operation of the embodiment shown in Figs. 1–5 is as follows: The holding device 39 is first shifted upwardly until the studs 41 abut against the lower edges of the flange 42. The device 39 is then opened by disengaging the clamp 48 and swinging the plate 46 away from the plate 44. Thereafter, the film 52 is placed with its marginal edges between the pins 56, and the device 39 closed and the clamp 48 latched to the edge 40. The film 52 is now movable longitudinally in its emplacement in the groove 54 but is held against lateral movement by the pins 56.

The lamp 66 is then switched on and the operator will look through the magnifying viewing device 33, moving the lens 36 to adjust the viewing device optics to his particular eye sight. Thereafter, the operator will move the film strip longitudinally in the groove 54 to select a desired frame 53 for subsequent enlargement. As soon as a frame has been selected, the operator will tilt the pin 61 which has been separated from the plates 44 and 46, about the pivot 47, and insert the pin 61 through the holes 63 where it will engage a sprocket hole 64 and thereby lock the film strip to maintain the selected frame in registry between the aligned apertures 49 and 51.

Thereafter, the entire film strip holding device 39, including the film strip 52 clamped therein, is slid downwardly until the studs 43 abut against the upper side of the flange 42. This movement brings the aligned apertures 49 and 51 and therewith the selected film frame into registry with the optical system of the camera 23, and the enlarging apparatus is now ready for an exposure. The exposure is made by operating the shutter knob 28 for the desired exposure time. Thereafter, the photo-sensitized material within the camera 23 may be advanced to the next position by turning the winding knob 24. The apparatus is thereby made ready for the next frame selection and enlargement.

The operation in connection with the modified holding device 139 illustrated in Fig. 6 is similar to the above described operation, except that the film strip 52 is placed in the groove 154 between the guiding pins 57 that are mounted thereon and movable therewith, prior to closing the device 139.

A different construction for clamping the film strip 52 between the plates is shown in Fig. 7, where the film strip holder is designated 239. The plates 244 and 246 are again provided with apertures, indicated at 249 and 251 respectively, and the device may be closed by means of a clamp 248 of the plate 246 engaging the overturned edge 240 of the plate 244. However, there is no groove provided between the plates, but instead, the plates abut throughout their faces in the absence of the placement of a film therebetween. If a film is inserted between the plates, the latter will be spaced from each other for a distance corresponding to the very small thickness of a conventional film.

Upon closure of the device 239, the film strip which is limited in its sidewards movement by the margin engaging pins 256 will be clamped tightly between the plates. In order to move the film strip longitudinally for selection of a frame, I provide a movable wedge 71 that is manually operable by means of a knob 72, to be wedged between the plates against the resilient power of the clamp 248. Upon insertion of the wedge 71, the plates will be sufficiently separated from each other to permit longitudinal movement of the film strip without, however, disengaging the clamp 248. After the frame has been selected, the wedge 71 may be moved to release the plates and the plates will engage the film strip under the squeezing pressure exerted by the resilient clamp 248.

In order to maintain a desired film strip frame in registry in this embodiment, I provide a small detent 261 that is located opposite a hole 263 and which cooperates therewith. The detent 261 is so positioned that it engages a sprocket hole of the film when a frame is registered with the apertures 249 and 251 and the guide plates are firmly closed, but the protrusion of the detent is so small that the film is released, immediately, when the wedge 71 is forced between the two guide plates.

The four margin engaging pins 256 may each have a neck 70 that has a slightly smaller diameter than the head of the pin, and the neck contours of the pins be spaced from each other for the width of the film strip. Thereby, the film strip may be snapped in and out of position manually, without the possibility of accidental disengagement.

A different means to accomplish the purpose referred to is illustrated in Fig. 8. A camera 323 with a tubular support 326 and a lens on the interior (not shown) carries at the end of the tube 326 a plate 73. A view-finder 74 that carries a lens 76 is hinged at 77 to one edge of the plate 73. Near the opposite edge of said plate there is pivoted to it at 76 a film strip holding device 339 that comprises two plates 344 and 346 hinged together on one longitudinal side at 75 and carrying a light source 366. The distance between the axis of the optically aligned view finder 76 and the device 339 from the plate 73 is so dimensioned and the hinges so designed that the film in the device may first be viewed through the viewing device 74 when both the device and the holder are held erect on the plate by any suitable means (not shown). Subsequently, the device 339 may be swung about its pivot 76 to have its axis coinciding with the optical axis of the camera 323 for enlarging the selected frame. The plates are again held together by a clamp, designated 348, and the device may be opened by swinging one plate relative to the other about the hinge 75. The view finder 74, as well as the device 339 may be swung towards the plate 73 for folding the apparatus to reduced longitudinal size.

Another device of a similar character is shown in Figs. 9 and 10. A fixed focus photographic apparatus, indicated at 78 is provided with a reel mechanism 79 for a film 81 for manual film feed. The film 81 is passed between two apertured plates, a lower fixed plate 82 and an upper movable plate 83 that, in its normal position, has its aperture in optical registry with that of the fixed plate and which is carried on the underside of, and swingable with, a hollow casing 84 that is hinged at 86 to a lamp housing 87 for rocking movement. An electric lamp 88 and a reflector 89 are disposed in the lamp housing 87 in optical registry with the aperture of the fixed plate 82. At the top of the casing 84 there are arranged opposite channels 91 to receive in sliding engagement a shiftable carrier, generally designated 92, holding in fixedly spaced relation a viewing device 93 and a holder 94 for photo-sensitized material, for instance a film pack. The carrier 92 may be moved within the opposite channels 91 to be shifted between two extreme positions; in one position the viewing device 93 will be in registry with the optical axis of the apparatus 78, and in the other position the holder 94 will be in optical registry therewith. A lens 96 is provided in the interior of the casing 84, and a shutter 97 may be provided therein to control the exposure.

A related arrangement is shown in the embodiment illustrated in Figs. 11 and 12, in connection with a film editing device 102 of otherwise conventional construction including a light source 103 and a revoluble prism 110. In this arrangement, on the image receiving end 100 of the optical path 101 of the editing device 102, a carrier 92 is again mounted slidable in oppositely disposed channel structures 91, and has a viewing device 93 and a holder 94 for photo-sensitized material. The carrier 92 is again movable between two extreme positions, of registry with the optical axis of the editing device 102 with the viewing device 93 and the holder 94, respectively.

In the operation of the embodiments shown in Figs. 9–12, the selection of the desired frame is first carried out with the viewing device 93 in registry with the optical axis of the particular apparatus employed, and thereafter, the carrier 92 is shifted to bring the holder 94 of the photo-sensitized material into registry with the apparatus axis for a subsequent enlargement exposure.

I do not limit myself to the particular details of construction set forth in the foregoing specification and illustrated in the accompanying drawings, as the same refer to and set forth only certain embodiments of the invention and it is obvious that the same may be modified, within the scope of the appended claim, without departing from the spirit and scope of the invention.

Having thus described the invention, what I claim as new and desire to be secured by Letters Patent, is as follows:

In an enlarging device including a lens and a tubular member surrounding said lens, in combination, an element including a holding mechanism for an original to be enlarged and photographically to be reproduced, hinged near one end of said tubular member and being angularly movable between an active position transverse of said tubular member and in focus with and disposed on one side of said lens and an inactive position at a fixed angle to said active position, a viewing device spaced from said holding mechanism and in optical registry therewith in the inactive position of the latter, a receptacle for image receiving sensitized material disposed on the other side of said lens for receiving an image from said original in the active position of said holder, and a light source mounted near said holder and movable therewith for illuminating said original in either position.

MORRIS KAPLOWITZ.

References Cited in the file of this patent

UNITED STATES PATENTS

| Number | Name | Date |
| --- | --- | --- |
| 1,885,555 | Schwarz | Nov. 1, 1932 |
| 1,898,905 | Seitz | Feb. 21, 1933 |
| 1,955,170 | Bornmann | Apr. 17, 1934 |
| 1,959,498 | Planskoy | May 22, 1934 |
| 1,996,481 | Morgan | Apr. 2, 1935 |
| 2,009,262 | Hetherington | July 23, 1935 |
| 2,172,246 | Hood | Sept. 5, 1939 |
| 2,206,396 | Glass | July 2, 1940 |
| 2,234,698 | Hughey | Mar. 11, 1941 |
| 2,257,444 | Abaojieff | Sept. 30, 1941 |
| 2,287,640 | Raynes | June 23, 1942 |
| 2,461,668 | Thompson | Feb. 15, 1949 |